United States Patent [19]

Ogawa et al.

[11] Patent Number: 5,647,450
[45] Date of Patent: Jul. 15, 1997

[54] COOLING SYSTEM INCLUDED IN A BATTERY CHARGER FOR AN ELECTRIC VEHICLE

[75] Inventors: Masao Ogawa; Hiroyuki Sako; Kenji Kawaguchi; Masayuki Toriyama, all of Saitama, Japan

[73] Assignee: Honda Giken Kogyo Kabushiki Kaisha, Tokyo, Japan

[21] Appl. No.: 325,947

[22] Filed: Oct. 19, 1994

[30] Foreign Application Priority Data

Oct. 19, 1993 [JP] Japan .................. 5-261426

[51] Int. Cl.$^6$ .............. B60K 1/04; B60K 11/06; B62M 7/00
[52] U.S. Cl. ............. 180/220; 180/229; 180/68.4; 180/68.5
[58] Field of Search .................. 180/65.1, 65.3, 180/65.8, 220, 225, 68.5, 68.4, 229; 174/16.1; 429/82, 83, 74, 64; 105/59

[56] References Cited

U.S. PATENT DOCUMENTS

| | | | |
|---|---|---|---|
| 3,790,860 | 2/1974 | Verdisco | 317/100 |
| 4,703,825 | 11/1987 | Mikami | 180/229 |
| 5,222,572 | 6/1993 | Yamagiwa | 180/220 |
| 5,244,036 | 9/1993 | Michl | 180/229 |
| 5,476,138 | 12/1995 | Iwasaki et al. | 180/68.4 |

FOREIGN PATENT DOCUMENTS

| | | |
|---|---|---|
| 467151 | 1/1992 | European Pat. Off. . |
| 0469995 | 2/1992 | European Pat. Off. .......... 180/220 |
| 3167033 | 7/1991 | Japan . |
| 583863 | 4/1993 | Japan . |
| 083863 | 4/1993 | Japan . |
| 5116665 | 5/1993 | Japan . |

OTHER PUBLICATIONS

P Series Switching Regulator P150, ELCO, pp. 1–10.
Power Gorilla, COSEL, pp. 12–18.
PAK–A/AM Series Regulated DC Power Supply, Kikusui, No. 92052KP31.

*Primary Examiner*—Anne Marie Boehler
*Attorney, Agent, or Firm*—Birch, Stewart, Kolasch & Birch LLP

[57] ABSTRACT

A battery charger for an electric vehicle having a built-in heatsink provided with an air passage, and a built-in battery charger cooling fan for producing an air current through the air passage of the heatsink to cool the heatsink. The heatsink need not be provided with fins and hence the battery charger can be formed in a comparatively small size.

21 Claims, 16 Drawing Sheets

COOLING SYSTEM INCLUDED IN A BATTERY CHARGER FOR AN ELECTRIC VEHICLE

BACKGROUND OF THE INVENTION

1. Field of the Invention

The present invention relates to improvements in a cooling system for cooling a battery charger for an electric vehicle.

2. Description of Related Art

The applicant of the present patent application proposed a battery charger for an electric vehicle previously in Japanese Patent Laid-open (Kokai) No. 5-83863. In the battery charger disclosed, heat generated by a choke coil and an FET is absorbed by a heatsink and the heatsink is cooled with air blown by an exhaust fan to suppress the rise of the temperatures of the choke coil and the FET. The heatsink is provided with fins having a comparatively large height. Therefore, a battery charger has a relatively large height and a relatively large size.

When the electric vehicle is a motorcycle, only a limited space is available for mounting equipment and the battery charger must be formed in a comparatively small size.

SUMMARY AND OBJECTS OF THE INVENTION

It is an object of the present invention to provide a battery charger having a comparatively small size to be mounted on an electric vehicle.

With the foregoing object in view, the present invention provides a cooling system included in a battery charger, comprising a heatsink provided with an air passage, and a battery charger cooling fan for producing an air current through the air passage of the heatsink to cool the heatsink.

The heatsink is disposed with one end thereof contiguous with an air inlet formed in a battery charger case, and the battery charger cooling fan is disposed near the other end of the heatsink, or the heatsink is disposed with its longer side extended along the direction of width of the body of the electric vehicle, and FETs (field-effect transistors) are arranged in contact with the outer surface of the heatsink.

Air discharged by the battery charger cooling fan may be discharged outside through a discharge hose connected to the battery charger case. The discharge hose is extended longitudinally of the body of the electric vehicle and is concealed from view by a side cover.

Since the heatsink has a hollow construction and need not be provided with fins, the battery charger including the cooling system can be formed in a compact construction.

Air flows through the air inlet, the air passage of the heatsink and the battery charger cooling fan in that order. Heat generated by the FETs is absorbed and dissipated by the heatsink to cool the FETs forcibly.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

A preferred embodiment of the present invention will now be described with reference to the accompanying drawings.

Figure 1:
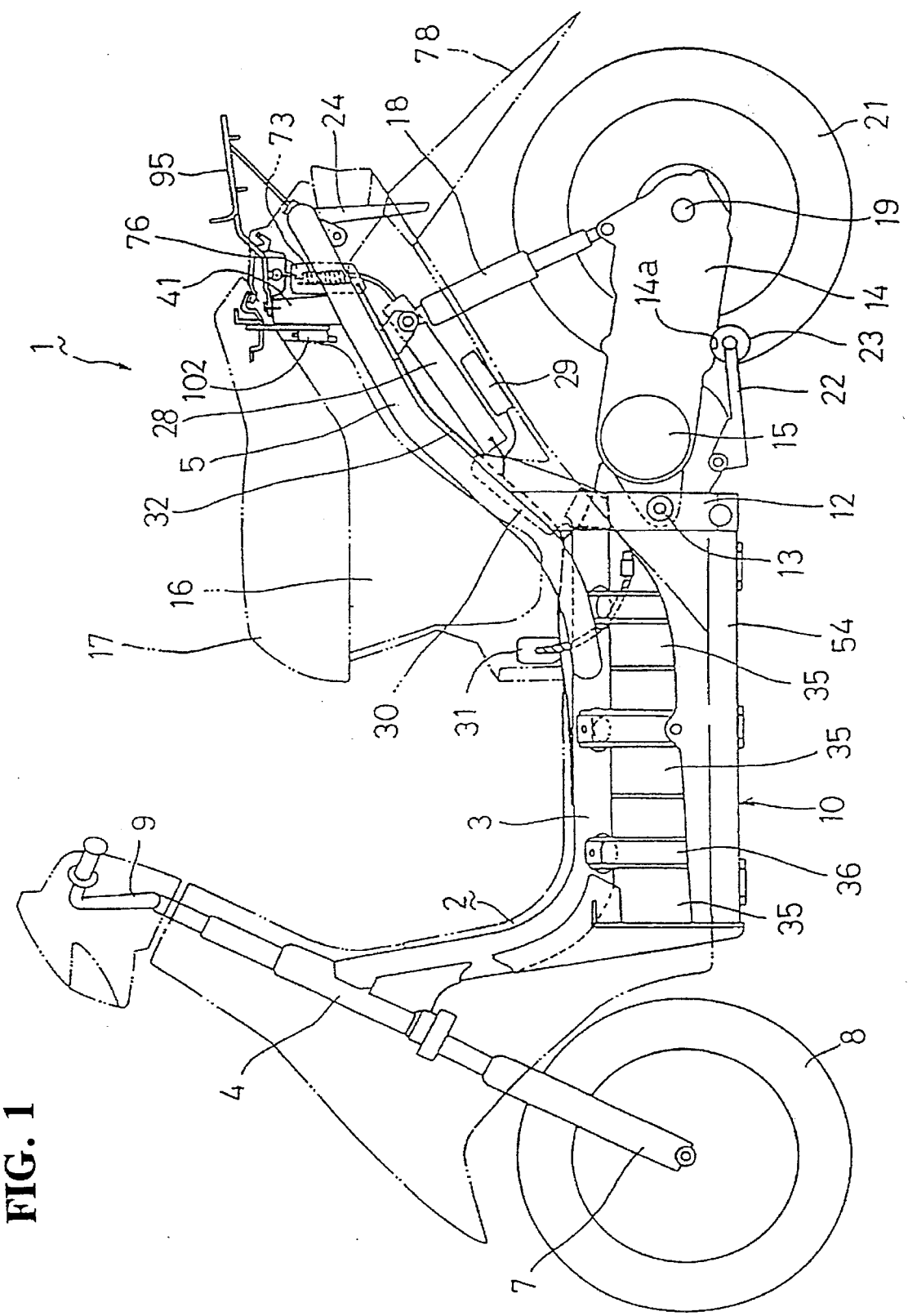
FIG. 1 is a side view of an electric vehicle incorporating a battery charger cooling system in accordance with the present invention.

FIG. 1 is a side view of an electric vehicle incorporating a battery unit cooling system of the present invention. An electric vehicle 1, which is an electric motorcycle, comprises a chassis frame 2 comprising a main frame 3, a head pipe 4 attached to the front end of the main frame 3, and a rear frame 5 extending obliquely upward from the rear end of the main frame 3.

A front fork 7, supported on the head pipe 4, supports a front wheel 8 on the lower end thereof. A handlebar 9 is attached to the upper end of the front fork 7. A battery case 10 is suspended from the main frame 3. A swing power unit 14 including a driving motor 15 is pivotally joined at its front end to the rear end of the main frame 3 with a pivot shaft 13.

A storage box 16 is mounted on the rear frame 5. A seat 17 is mounted on the rear frame 5 above the storage box 16. A rear shock absorber 18 is pivotally joined at an upper end to the rear frame 5 and a lower end pivotally joined to the rear end of the swing power unit 14. A rear wheel 21 is supported on a rear axle 19 at the rear end of the swing power unit 14.

Electric parts including a battery charger are arranged along the rear frame 5. The chassis frame 2 is covered entirely with a cowling and fenders, which will be hereinafter described. A seat locking mechanism serving also as a locking mechanism for locking a lid covering the mouth of a plug container is disposed behind the seat 17, which will also be hereinafter described in detail.

FIG. 1 further illustrates a side stand 22, a roller 23, a recess 14a for receiving the roller 23 therein, and a license plate holder 24.

Figure 2:
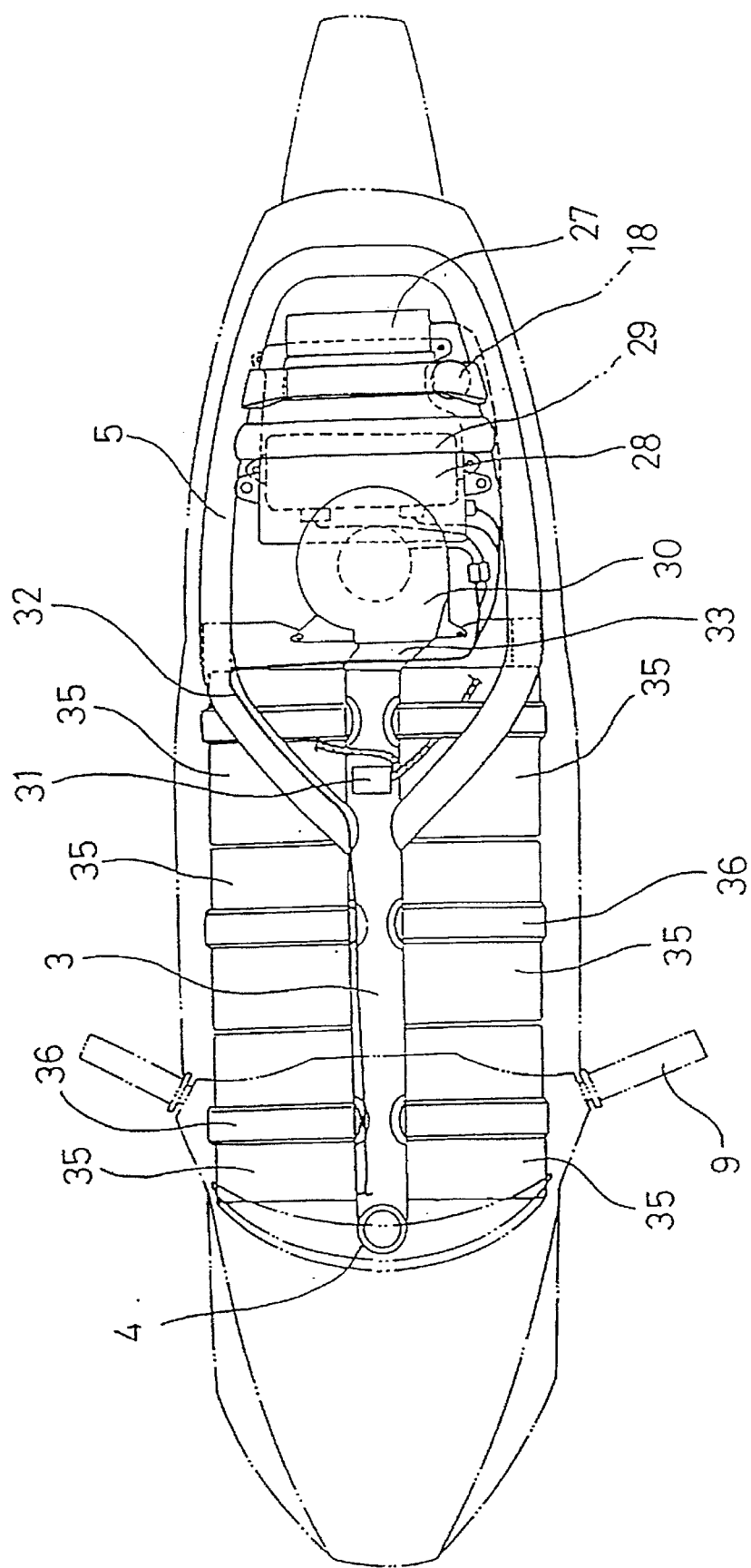
FIG. 2 is a plan view of a chassis frame and the associated parts included in the electric vehicle of FIG. 1.

FIG. 2 is a plan view of the chassis frame of the electric vehicle incorporating the battery unit cooling system of the present invention. The rear frame 5 has a substantially oval shape in a plan view. Inside the rear frame 5 there are arranged a down regulator 27, a charging controller 28 for controlling battery charging operation, a motor controller 29 for controlling the driving motor and the associated parts for traveling, a battery cooling fan 30, and a fuse box 31 in that order on the rear frame 5 from the rear side toward the front side. The electric components are connected to a wiring harness 32.

The main frame 3 is a hollow pipe which also serves as a main duct. One end of the main frame 3 is connected to a discharge duct 33 connected to the battery cooling fan 30. The construction of the main frame 3 serving also as a main duct will be hereinafter described.

In this embodiment, six battery units 35 are mounted to the main frame 3. Three battery units 35 are arranged longitudinally on the right-hand side of the main frame 3 and three battery units 35 are arranged longitudinally on the left-hand side of the main frame 3. The battery units 35 are held in place with battery fastening bands 36.

Figure 3:
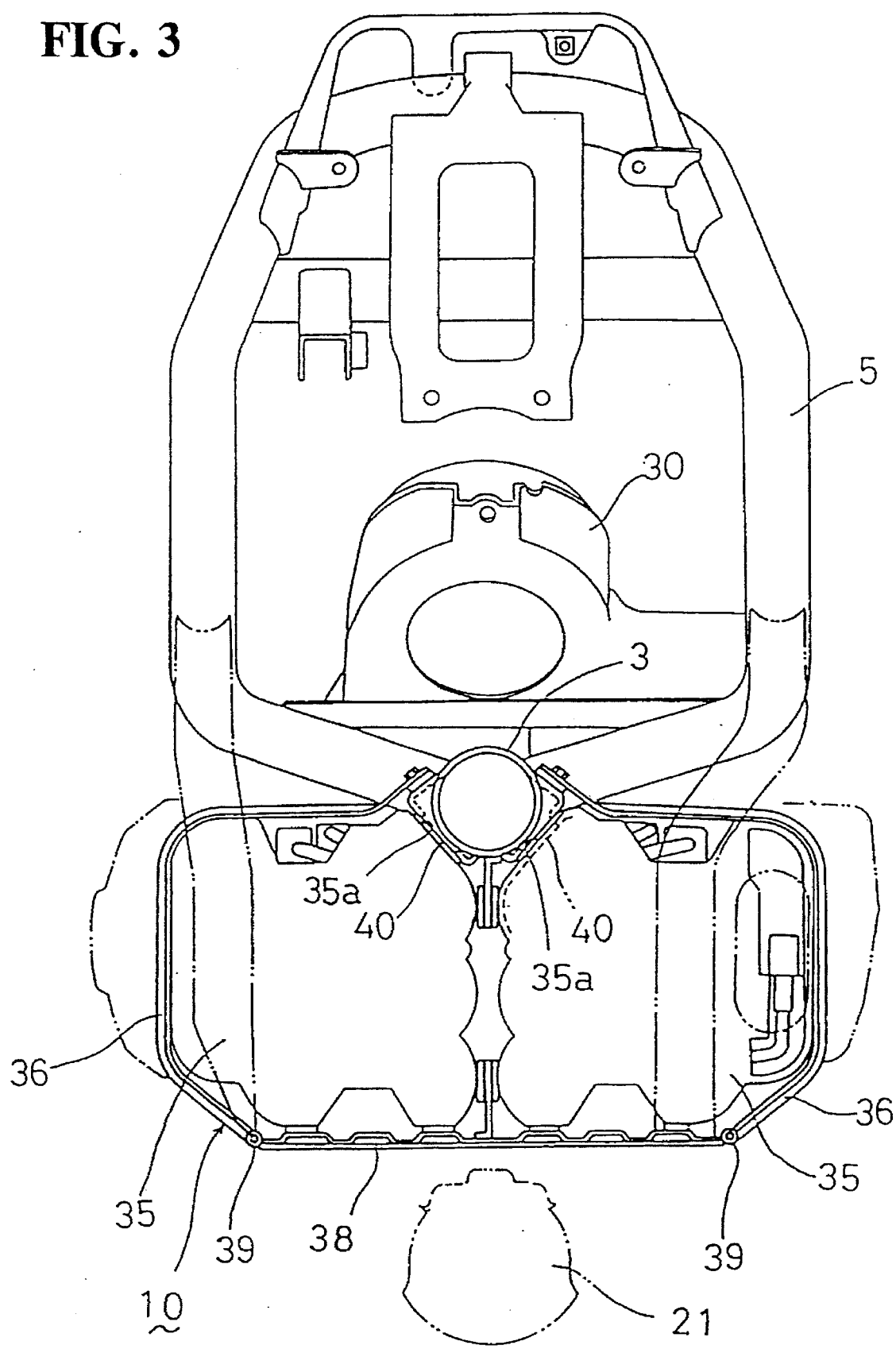
FIG. 3 is a cross-sectional view of the body of the electric vehicle of FIG. 1.

FIG. 3 is a cross-sectional view of the chassis frame taken in the substantially middle portion of the chassis frame. The bottom plate 38 of the battery case 10 is disposed under the main frame 3. The battery units 35 are mounted on the bottom plate 38. Each battery unit 35 has an air inlet 35a connected to a branch duct 40 branching from the main frame 3. The bottom plate 38 is formed as a corrugated plate and has a comparatively high rigidity. The lower ends of the battery fastening bands 36 are joined to hinges 39 formed on the right and left side of the bottom plate 38.

Figure 4:
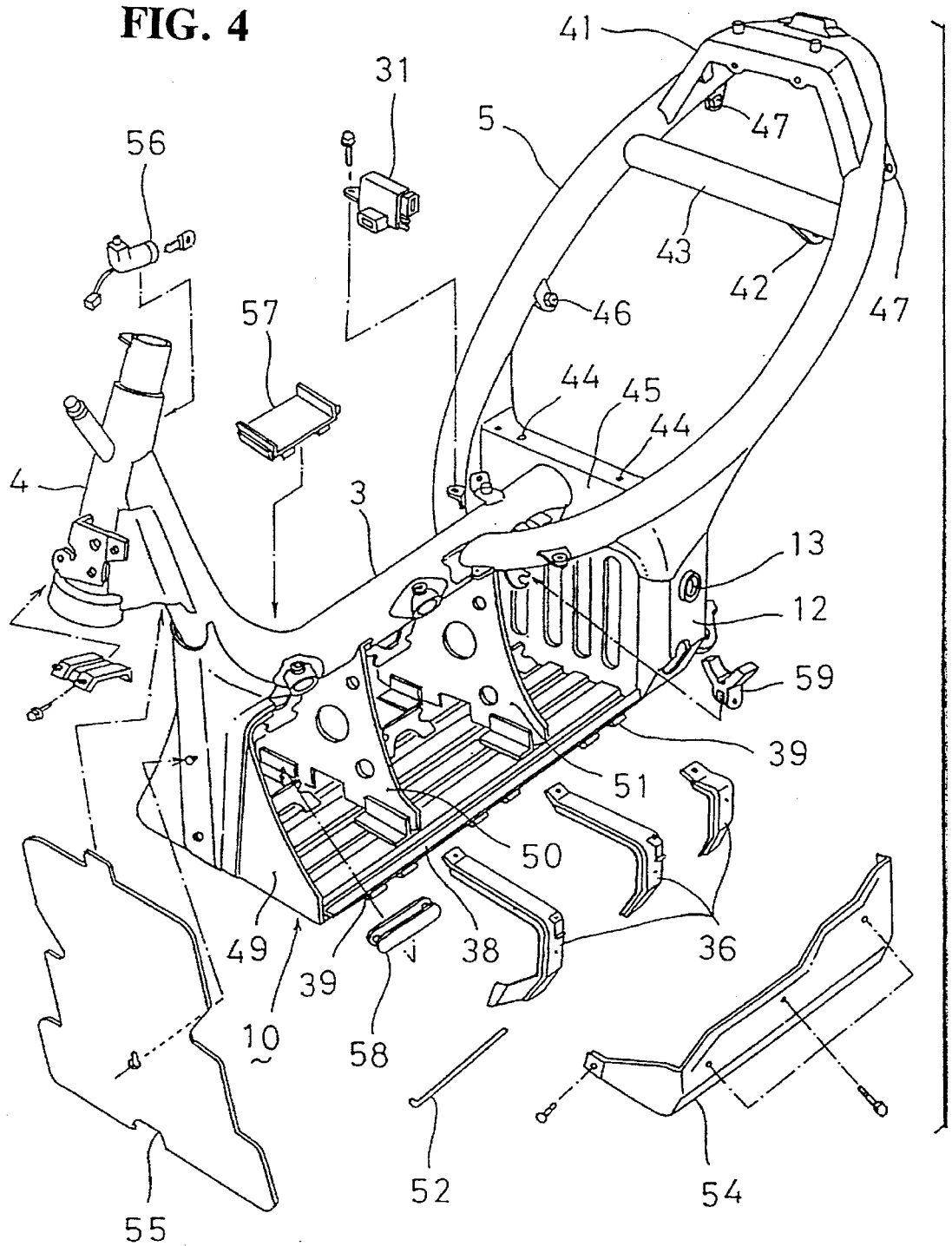
FIG. 4 is an exploded perspective view of a chassis frame, a battery case and the associated parts included in the electric vehicle of FIG. 1.

FIG. 4 is an exploded perspective view of the chassis frame 2, the battery case 10 and the components of the electric vehicle 1. As shown in FIG. 4, a bridge bracket 41, a cross pipe 43, and a cross panel 45 extend across and are attached to the oval rear frame 5. The cross pipe 43 is provided with a bracket 42 to which the upper end of the rear shock absorber 18 is pivotally joined. The cross panel 45 is provided with holes 44 for receiving screws for fastening the battery cooling fan. The cross panel 45 also extends between brackets 12 for supporting the pivot shaft 13. Lugs 46, 47 for supporting the charging controller 28 and the motor controller 20 are provided on the rear frame 5.

Substantially triangular brackets 49, 50 and 51 are suspended from the main frame 3, and the lower sides of the brackets 49, 50 and 51 are joined to the bottom plate 38. A hinge pin 52 is inserted in the hinges 39 formed on each side of the bottom plate 38 and the hinges formed at the lower ends of the battery fastening bands 36 to join the battery fastening bands 36 pivotally to the bottom plate 38.

Lower side covers 54 are attached to the opposite sides of the battery case 10. A front cover 55 is attached to the front end of the battery case 10. In FIG. 4, a main switch 56 including an ignition key switch is provided on the headpipe 4. Battery support plates 57 and cushion members 58 and 59 for preventing the lateral dislocation of the battery units 35 are also provided.

Figure 5:
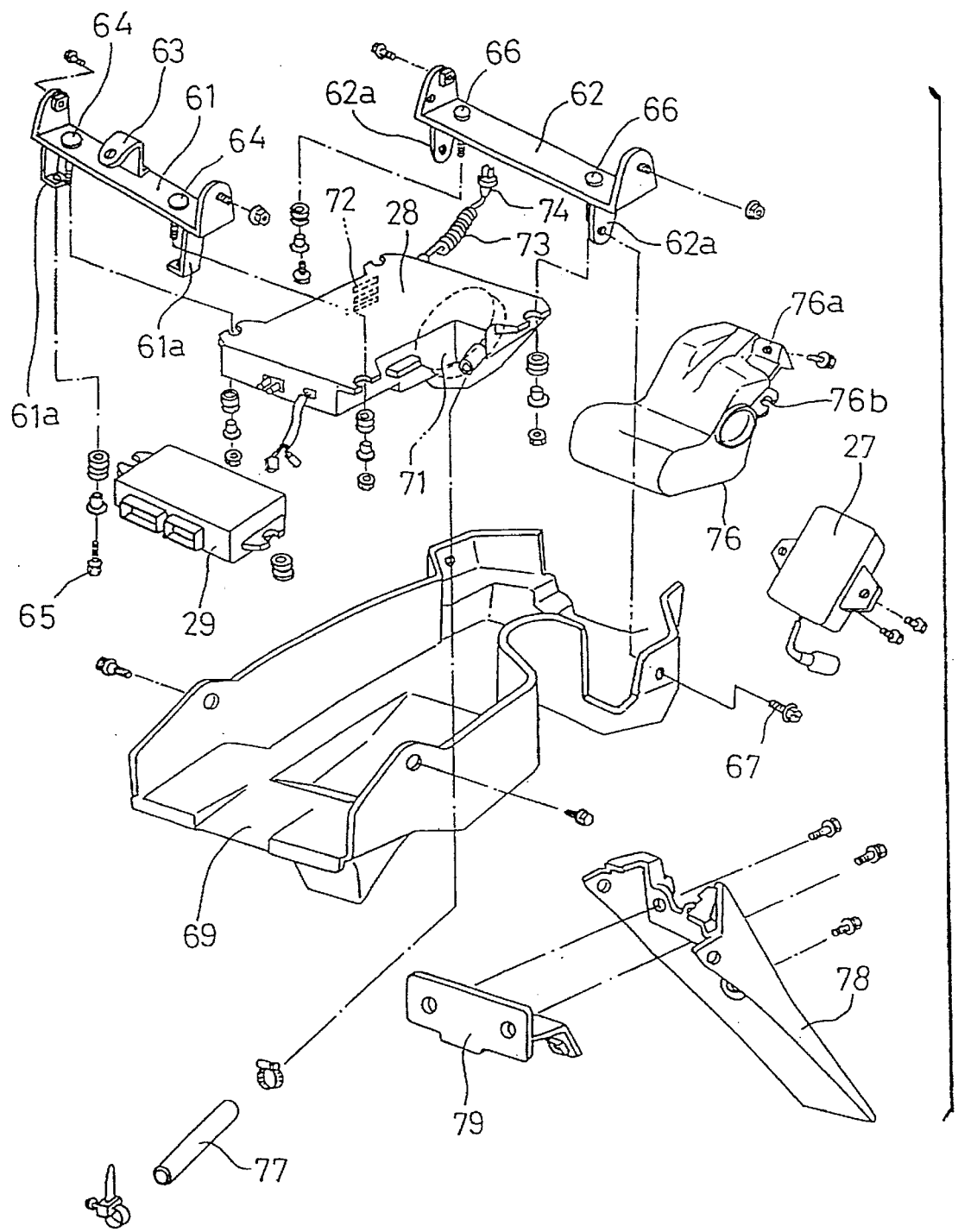
FIG. 5 is an exploded perspective view of controllers, a rear fender and other parts included in the electric vehicle of FIG. 1.

FIG. 5 is an exploded perspective view of a portion of the electric vehicle 1 around the controllers and the rear fender. A front controller support plate 61 is fastened to the lugs 46 (shown in FIG. 4) with bolts, and a rear controller support plate 62 is fastened to the lugs 47 (shown in FIG. 4) with bolts.

The front controller support plate 61 is provided on its upper surface with a bracket 63 to which the battery cooling fan is attached. The front end of the charging controller 28 is fastened to the front controller support plate 61 with bolts 64. The front controller support plate 61 is provided with leg portions 61a at its opposite ends, and the motor controller 29 is fastened to the extremities of the leg portions 61a with bolts 65.

The rear end of the charging controller 28 is fastened to the rear controller support plate 62 with bolts 66. The rear controller support plate 62 is provided with legs 62a at its opposite ends, and the rear end of a rear fender 69 is fastened to the legs 62a with bolts 67. The rear fender 69 extends over a rear wheel 21, not shown in FIG. 5, and serves also as a box for containing the charging controller 28 and the motor controller 29 and the associated parts.

The internal components of the charging controller 28 generate heat during battery charging operation. Therefore, the charging controller 28 must be cooled by forced cooling. The charging controller 28 is provided with a charger cooling fan 71 and air inlet slots 72 which are formed in the side wall of the charging controller 28 for forced cooling. A charging cable 73 provided with a plug 74 is stored in a charging cable box 76. The charging cable box 76 is formed of a resin by blow molding and is provided with lugs 76a and 76b which are fastened to the chassis frame 2.

Heat generated within the battery charger is discharged through a discharge hose 77 shown in the lower left-hand corner of FIG. 5. A rear mud guard 78 is attached to a bracket 79.

Figure 6:
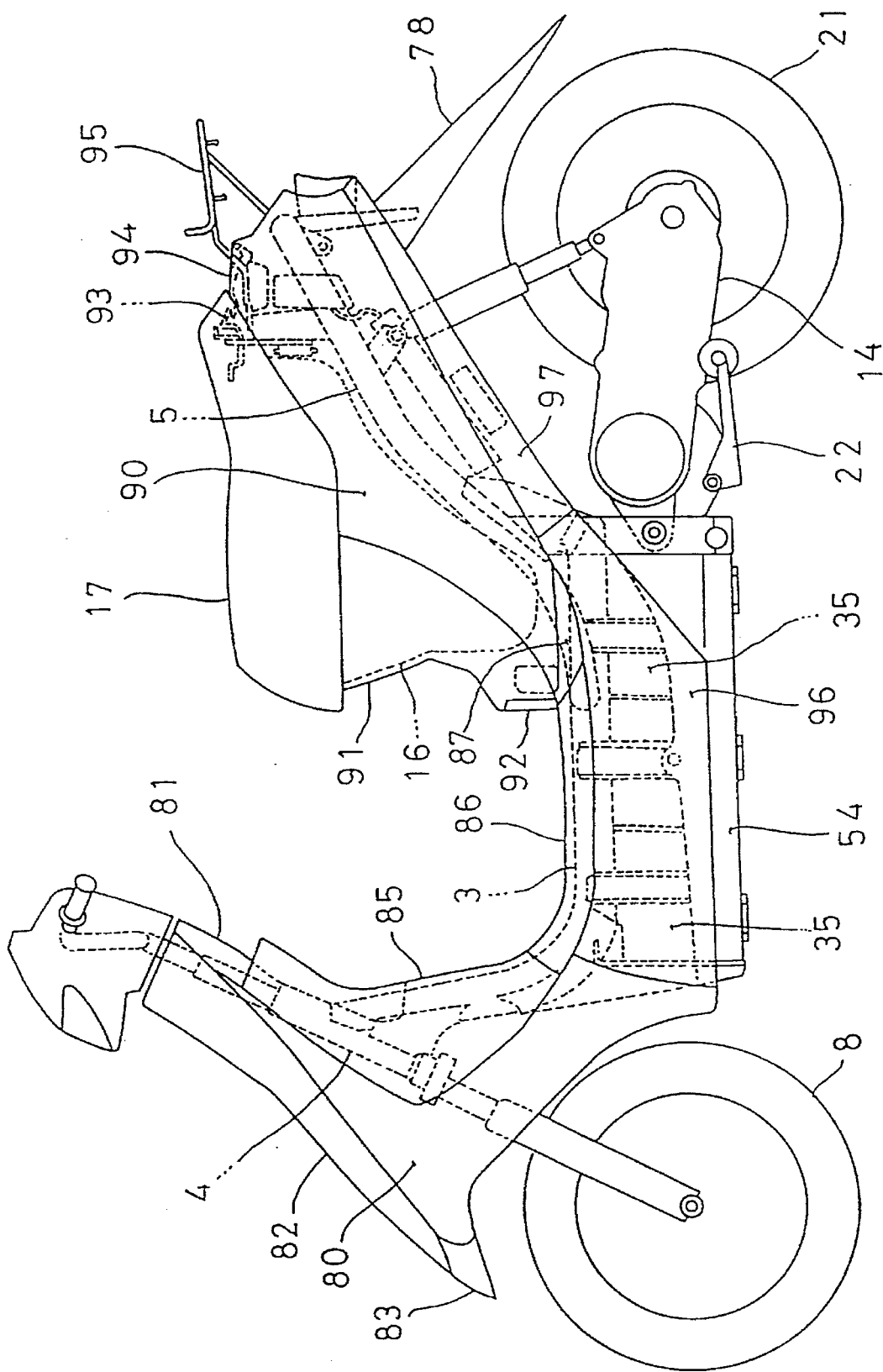
FIG. 6 is a side view of the electric vehicle of FIG. 1 as equipped with fenders and covers.
Figure 7:
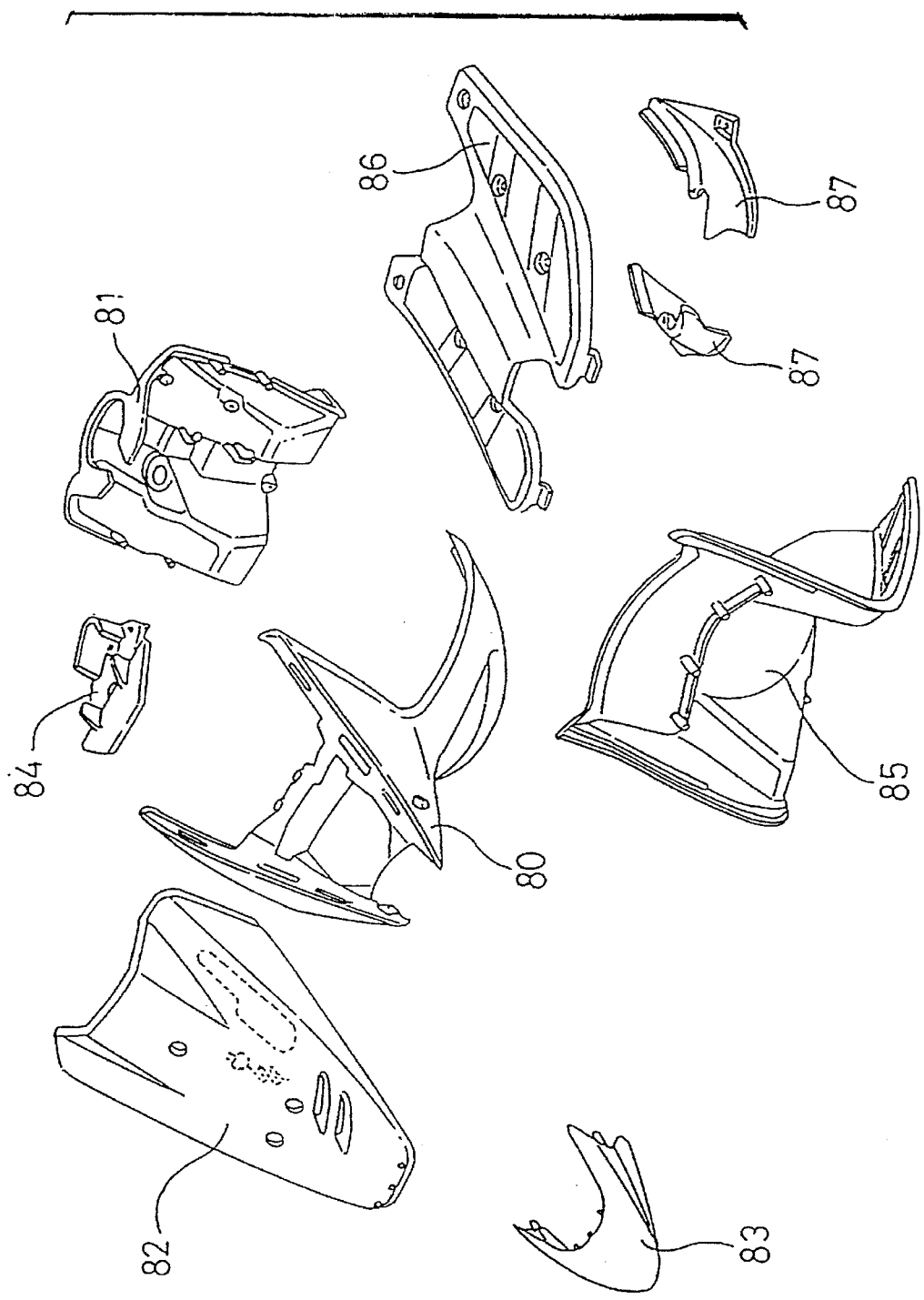
FIG. 7 is an exploded perspective view of fenders and covers for covering the front portion of the electric vehicle of FIG. 1.
Figure 8:
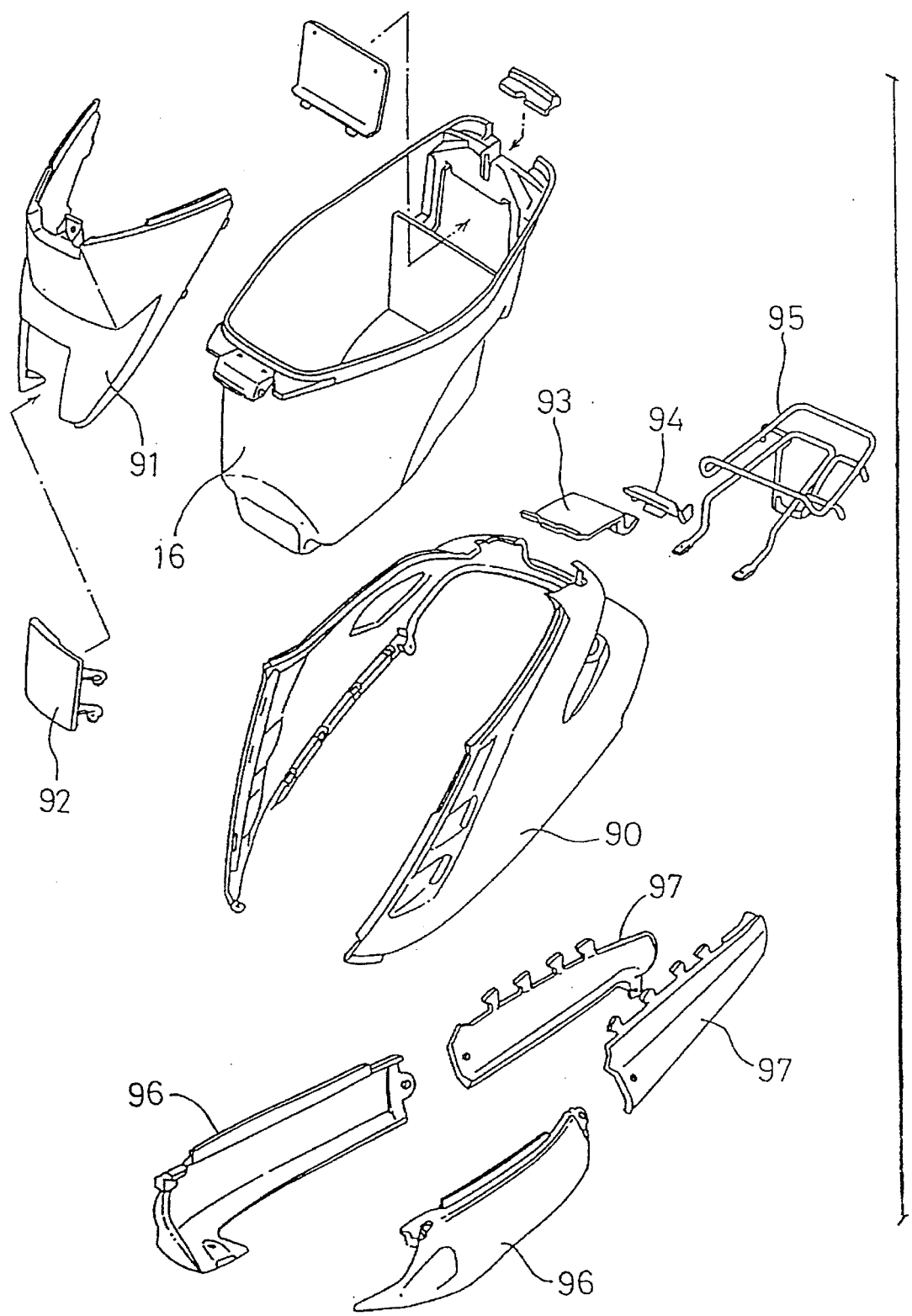
FIG. 8 is an exploded perspective view of fenders and covers for covering the rear portion of the electric vehicle of FIG. 1.

FIG. 6 is a side view of the electric vehicle equipped with fenders and covers. FIG. 7 is an exploded perspective view of the fenders and covers for covering the front portion of the chassis frame. FIG. 8 is an exploded perspective view of the fenders and covers covering the rear portion of the chassis frame.

Referring to FIG. 7, a front fender 80, is provided with a front inner upper cover 81 connected thereto. A front upper cover 82 is joined to the upper end of the front fender 80. A front mud guard 83 is joined to the lower end of the front fender 80. In addition, a handlebar cover 84, a front inner upper cover 85, a step board 86, and side floors 87 are provided. These covering members are assembled so as to cover the main frame 3 and the head pipe 4 as shown in FIG. 6.

Referring to FIG. 8, the storage box 16 is surrounded by a main cover 90 and a central cover 91. A fuse box lid 92 is provided on the central cover 91 to close a fuse box. The fuse box lid 92 is openable for changing fuses. A first lid 93 and a second lid 94 are provided for covering a charging cable box. A rack 95 is attached to the main cover 90. Right and left floor side covers 96 are suspended from the step board 86 so as to cover the lower side openings of the battery case 10, and side covers 97 are joined to the rear part of the lower edge of the main cover 90. These covering members are assembled so as to cover the main frame 3 and the rear frame 5 as shown in FIG. 6.

Parts indicated by broken lines in FIG. 6 are those previously described with reference to FIG. 1 and hence the description thereof will be omitted.

Figure 9:
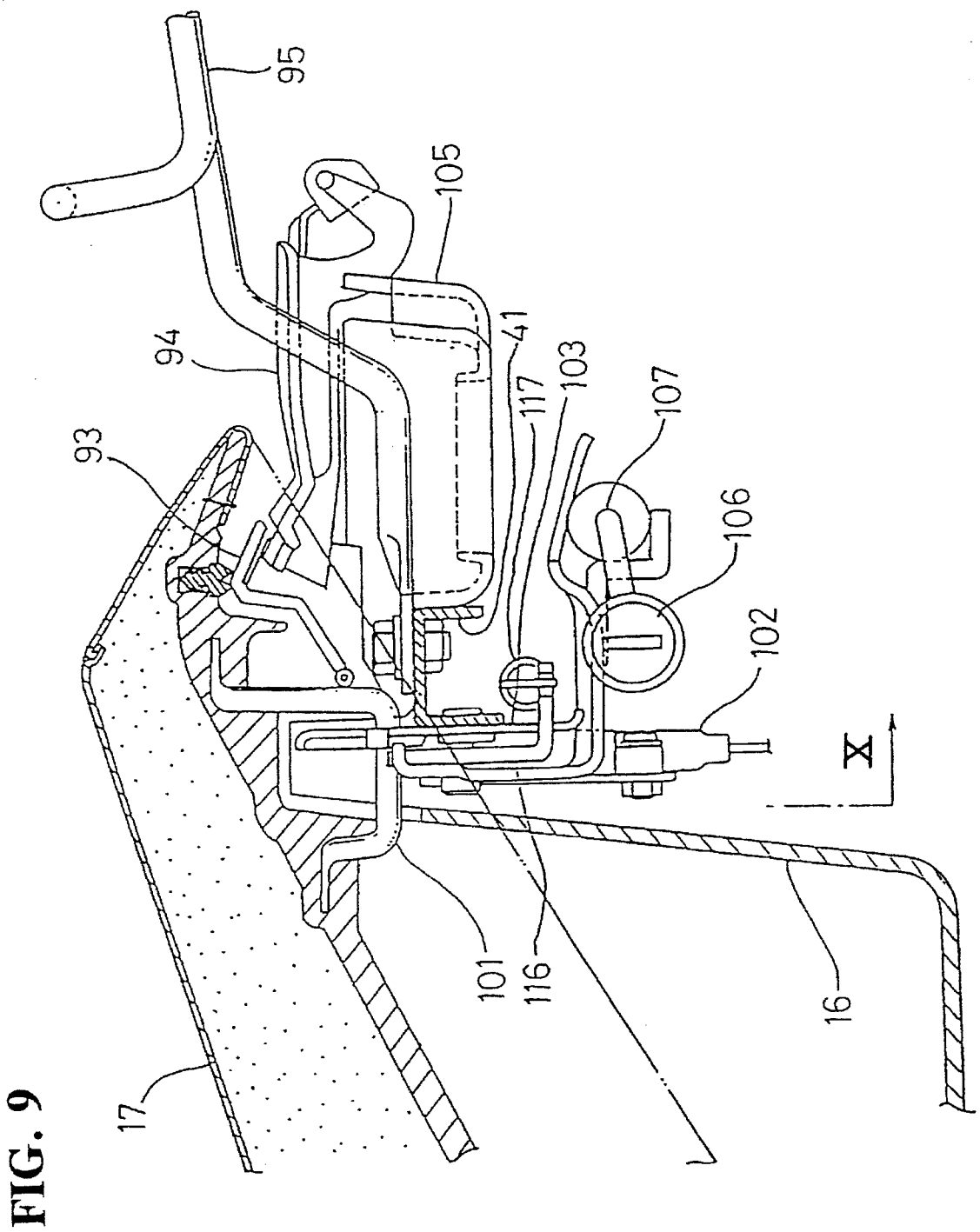
FIG. 9 is an enlarged view of the components of the electric vehicle of FIG. 1, arranged behind the seat (a locking mechanism for locking the seat and a lid covering a plug container)

FIG. 9 is an enlarged side view of the components of a seat locking mechanism serving also as a lid locking mechanism for locking a lid covering the charging cable box arranged behind the seat of the electric vehicle incorporating the battery cooling system of the present invention. A bent locking bar (or a bent locking pipe) 101 is attached to the rear part of the lower surface of the seat 17 covering the upper open end of the storage box 16, and a seat switch 102 is disposed under the locking bar 101 and is attached to a switch support plate 103 fastened to the bridge bracket 41 with bolts. The switch support plate 103 will be hereinafter described in detail.

The charging cable box 76 is covered with a first lid 93 and a second lid 94. When taking out the charging cable 73 (FIG. 1) from the cable box, first the seat 17 is raised, the first lid 93 is opened, and then the second lid 94 is opened. The plug 74 connected to the charging cable 73 is held by a plug holder 105.

A locking lever 107 is connected to a key cylinder 106. When the key cylinder 106 is turned so as to turn the locking lever 107 upward, the seat 17 is released.

Figure 10:
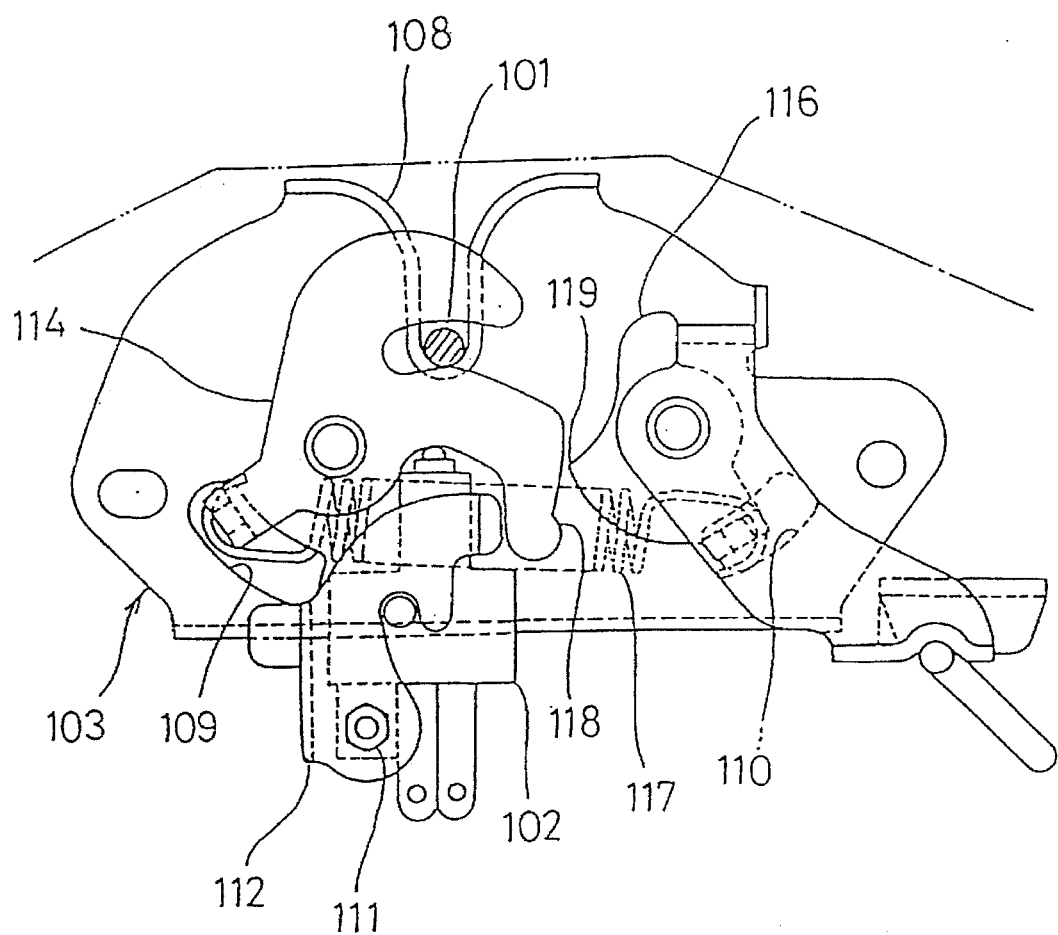
FIG. 10 is a view taken in the direction of the arrow X in FIG. 9.

FIG. 10 is a view taken in the direction of the arrow X in FIG. 9. Referring to FIG. 10, the switch support plate 103 is provided with a guide groove 108 for guiding the locking bar 101 in its upper portion, and two slots 109 and 110 having the shape of an arc of a circle formed respectively near the opposite ends of its lower portion.

The seat switch 102 is fastened to a small bracket 112 with a bolt 111, and the small bracket 112 is welded to the front surface of the switch support plate 103 so that the seat switch 102 is disposed in the center of the lower portion of the switch support plate 103.

A first swing plate 114 is supported pivotally on the switch support plate 103. The first swing plate 114 is turned downward to actuate the seat switch 102 when the locking bar 101 is lowered.

A second swing plate 116 is supported pivotally on the switch support plate 103. The first swing plate 114 is biased counterclockwise by a spring 117, and the second swing plate 116 is biased clockwise by the spring 117.

When the passenger leaves the seat 17, the first swing plate 114 is turned slightly counterclockwise from the position shown in FIG. 10 by the spring 117, so that an arm 118 of the first swing plate 114 comes into contact with a cam 119 formed on the second swing plate 116.

Since the second swing plate 116 is stationary, the first swing plate 114 is unable to turn further counterclockwise and, consequently, the locking bar 101 is restrained from further upward movement by the first swing plate 114 and hence the seat 17 is locked in place and cannot be turned upward.

In other words, the state shown in FIG. 10 is established when the passenger sits on the seat 17 and the first swing plate 114 is rotated in order to depress the seat switch 102. The first swing plate 114 is turned slightly counterclockwise from the position shown in FIG. 10 by the spring 117 and is separated from the seat switch 102 when the passenger is not seated on the seat 17. Thus, it is possible to detect electrically whether or not the passenger is seated on the seat 17 while the seat 17 is locked in place.

A procedure for raising the seat 17 will be described hereinafter. First, the key cylinder 106 (FIG. 9) is turned to raise the locking lever 107 upward. Consequently, the second swing plate 116 (FIG. 10) is turned counterclockwise and the cam 119 of the second swing plate 116 moves below the arm 118 of the first swing plate 114 to release the arm 118. Then, the first swing plate 114 is turned counterclockwise through a large angle by the spring 117 to enable the locking bar 101 to move upward so that the seat 17 can be raised by hand.

Figure 11:
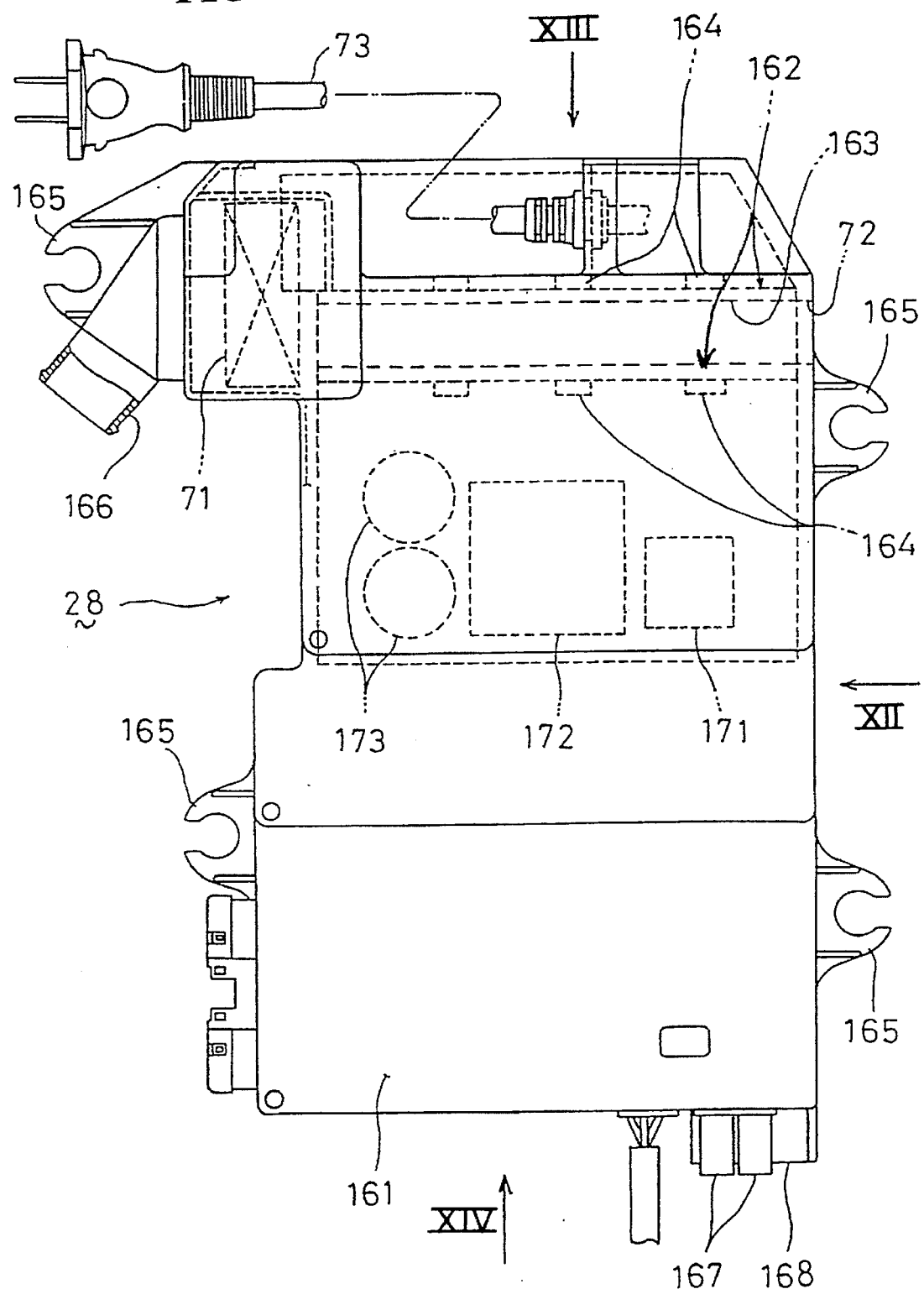
FIG. 11 is a bottom view of a battery charger relating with the present invention.

FIG. 11 is a bottom view of a battery charger according to the present invention. The battery charger (charging controller) 28 includes a battery charger case 161 provided with air inlet slots 72. The battery charger case 161 encloses built-in electric and electronic parts including a choke coil 171, a transformer 172 and capacitors 173. A built-in printed wiring board and a built-in heatsink 162 which includes an air passage 163 formed in its portion near a charging cable 73 are also provided. Field-effect transistors (FETS) 164 are arranged along the heatsink 162, and a battery charger cooling fan 71 is disposed on the longitudinal axis of the heatsink 162. The air inlet slots 72 are formed on the longitudinal axis of the heatsink 162. The heatsink 162 is a heat radiating part for quickly absorbing and dissipating the heat generated by a transistor, an IC chip or an electric part, such as a resistor. The heatsink 162 is formed of a material having a high heat conductivity, such as aluminum.

Mounting lugs 165 are provided on the battery charger case. An air outlet 166 is provided adjacent to the battery charger cooling fan 71.

Figure 12:
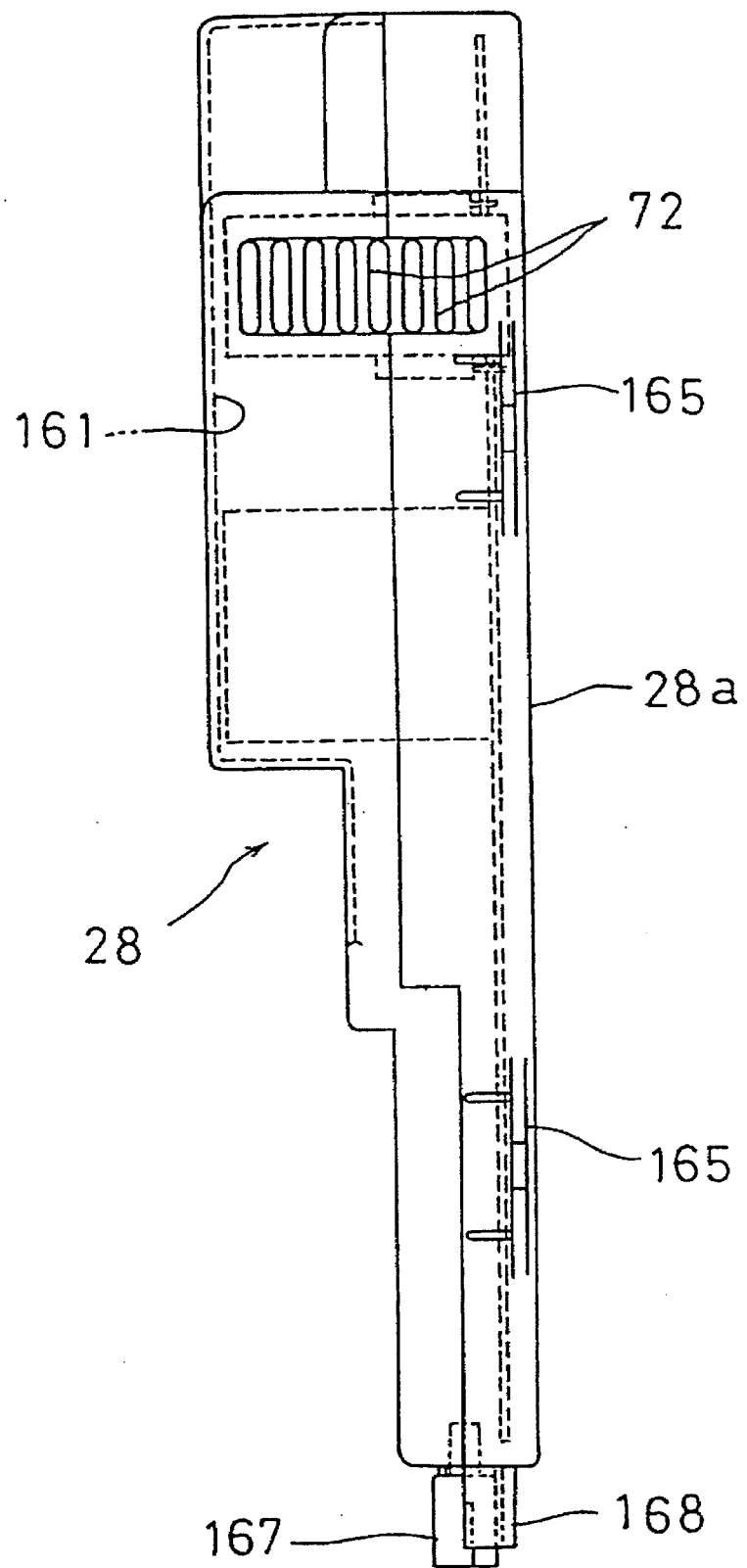
FIG. 12 is a view taken in the direction of the arrow XII in FIG. 11.

FIG. 12 is a view taken in the direction of the arrow XII in FIG. 11. As shown in FIG. 12, the air inlet slots 72 are formed in one side wall of the battery charger case 161 to suck fresh air therethrough into the battery charger case 161.

Figure 13:
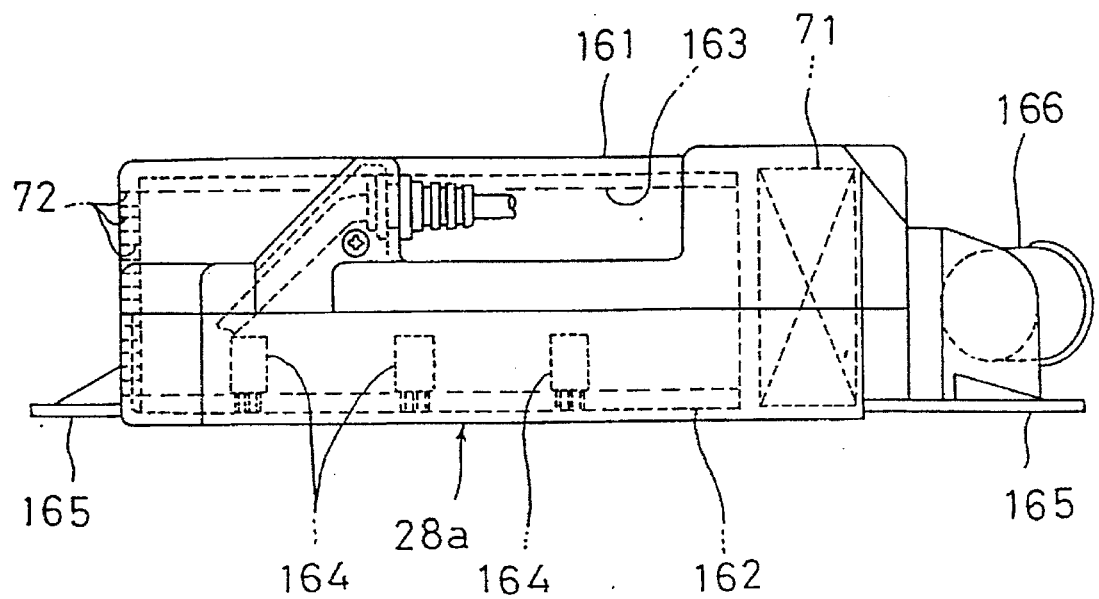
FIG. 13 is a view taken in the direction of the arrow XIII in FIG. 11.

FIG. 13 is a view taken in the direction of the arrow XIII in FIG. 11. As shown in FIG. 13, the heatsink 162 and the battery charger cooling fan 71 are arranged in a series arrangement within the battery charger case 161.

Figure 14:
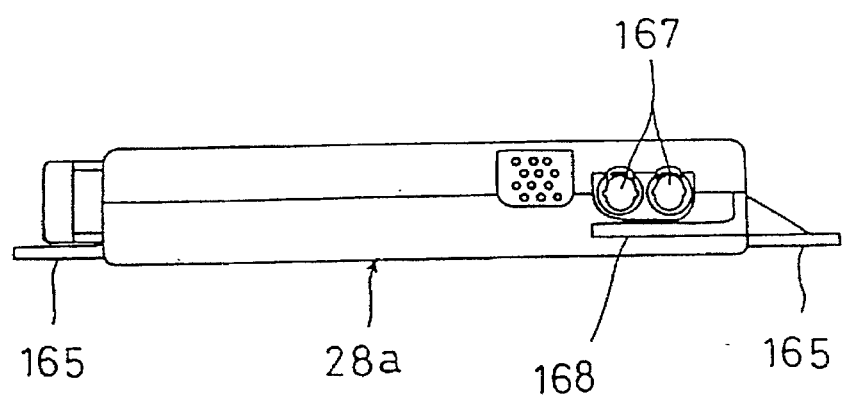
FIG. 14 is a view taken in the direction of the arrow XIV in FIG. 11.

FIG. 14 is a view taken in the direction of the arrow XIV in FIG. 11. As shown in FIG. 14, the connector support plate 168 projects from the end wall of the battery charger case at a position near plugs 167. The operation of the battery charger shown in FIGS. 11 to 14 will be described hereinafter.

Referring to FIG. 11, when the battery charger cooling fan 71 is started, a negative pressure is produced within the battery charger case 161 and, consequently, fresh air is drawn through the air inlet slots 72 into the battery charger case 161. The fresh air absorbs heat from the heatsink 162 and becomes hot air and the hot air is discharged through the air outlet 166.

As shown in FIG. 13, the heatsink 162 has a sufficiently large size and a large heat capacity, and is capable of absorbing heat from the FETs 164 to suppress the rise of the temperatures of the FETs 164. Since the FETs 164 are able to exhibit their ability at temperatures below a fixed temperature, it is important to cool the FETs 164 effectively.

The heatsink 162 is not provided with any fins and is formed in a cylindrical shape, so that the battery charger 28 provided with the heatsink 162 has a comparatively small height.

Referring to FIG. 14, the battery charger is characterized by the connector support plate 168 projecting from one end wall thereof. As shown in FIG. 12, the battery charger 28 has a large, flat upper surface 28a.

The battery charger 28 is set in a temporary position as shown in FIGS. 13 and 14, in which the upper surface 28a faces down, before the same is mounted on the electric vehicle 1. The temporary position of the battery charger 28 shown in FIGS. 13 and 14 is inverse to a working position in which the battery charger 28 is mounted on the electric vehicle 1.

The battery charger 28 is set in the temporary position and a connector, not shown, is connected to the plugs 167. The connector is supported securely by the connector support plate 168 so that an excessive force may not be exerted on the connector.

Figure 15:
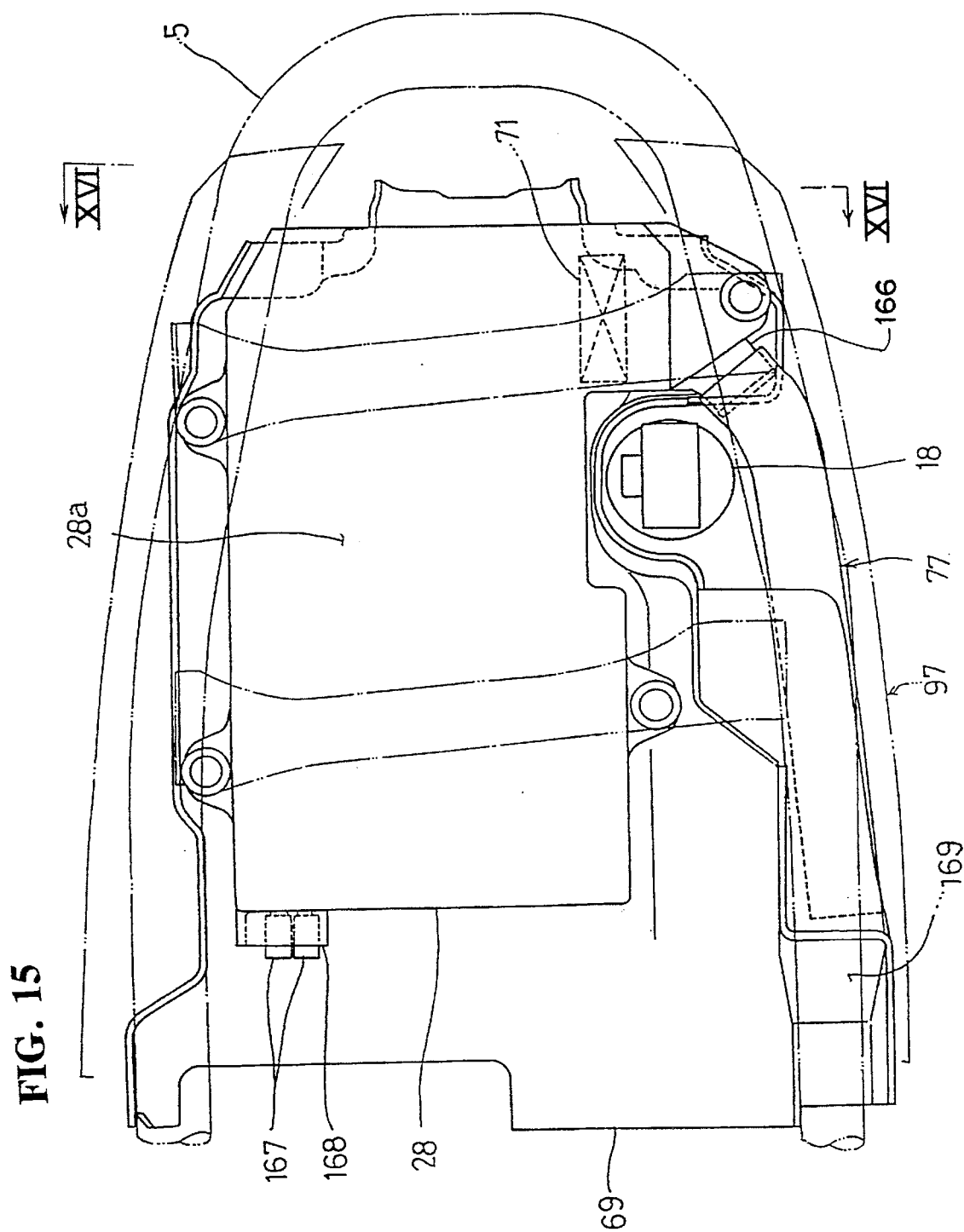
FIG. 15 is a plan view of the rear portion of the electric vehicle provided with the battery charger relating with the present invention.

FIG. 15 is a plan view of the rear portion of the electric vehicle provided with the battery charger 28 according to the principles of the present invention. The battery charger 28 is disposed above the rear fender 68, and the discharge hose 77 is connected to the air outlet 166 of the battery charger 28 so as to extend forward and to project obliquely downward from the side cover 97 as shown in FIG. 17.

Even if the interior of the discharge hose 77 is splashed and wetted with water when, for example, the electric vehicle 1 is washed, water drips from the discharge hose 77 by gravity because the discharge hose 77 extends obliquely downward from the air outlet 166.

Figure 16:
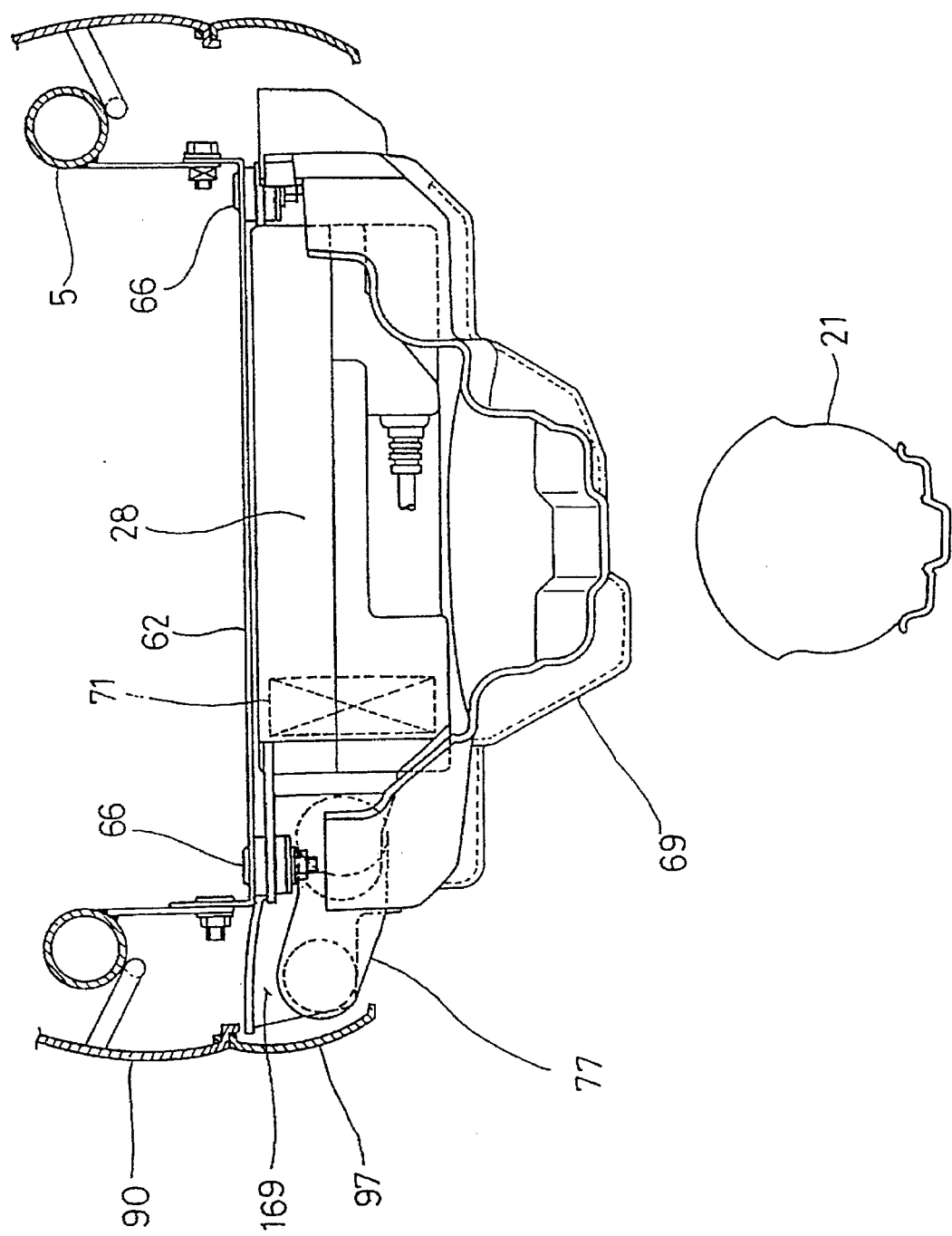
FIG. 16 is a view taken along the line XVI—XVI in FIG. 15.

FIG. 16 is a view taken along the line XVI—XVI in FIG. 15. As shown in FIG. 16, the battery charger 28 is fastened at its rear end with bolts 66 to the rear controller support plate 62 fastened to the rear frame 5 with bolts. The discharge hose 77 is concealed from view by the side cover 97.

Figure 17:
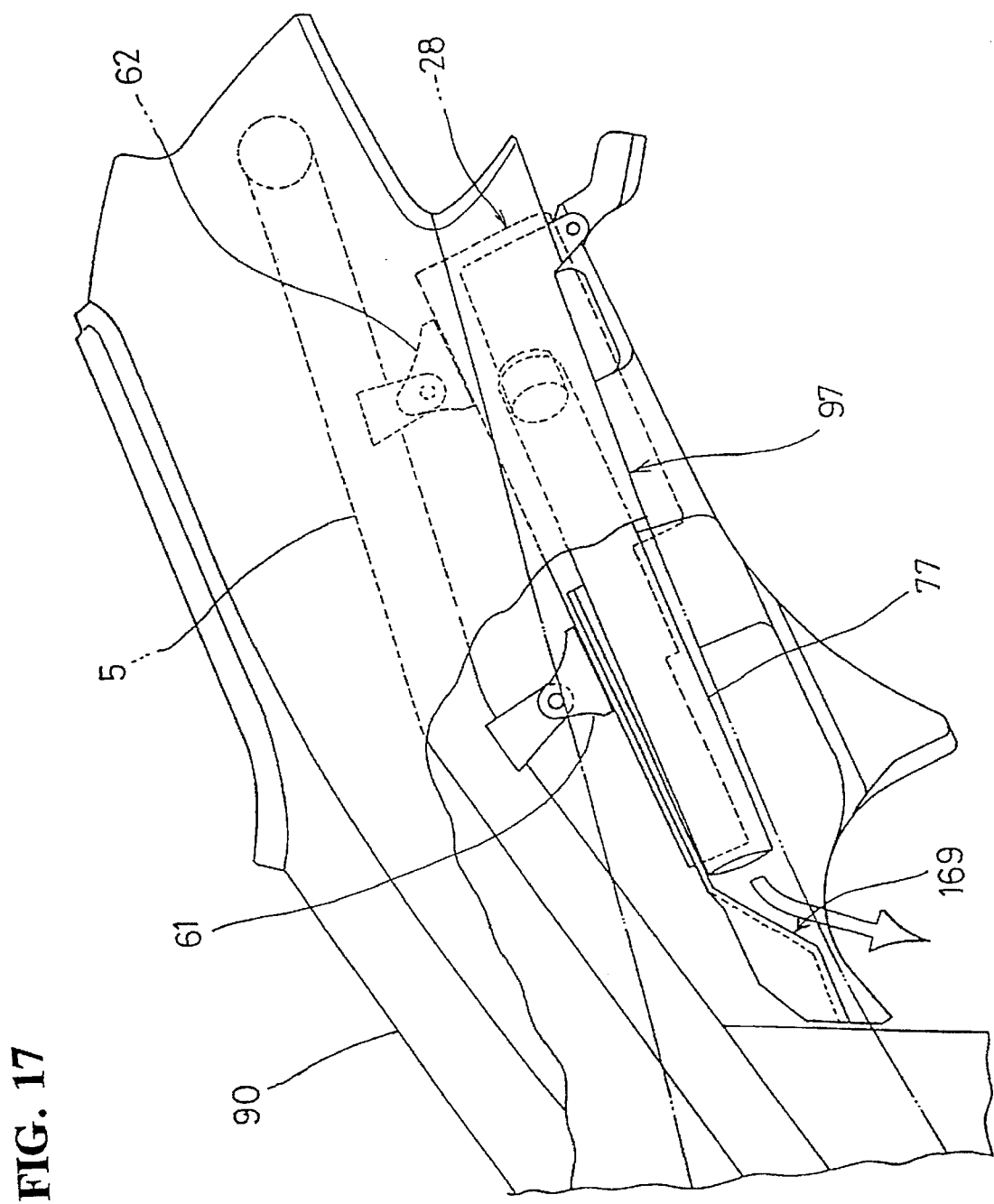
FIG. 17 is a side view of the rear portion of the electric vehicle provided with the battery charger according to the present invention.

FIG. 17 is a side view of the rear portion of the electric vehicle provided with the battery charger according to the principles of the present invention. As shown in FIG. 17, the main cover 90 is provided with an inclined projection 169 for deflecting air discharged forward through the discharge hose 77 downward. Therefore, the hot discharged air flows downward as indicated by the blank arrow.

The side cover 97 may be provided with a discharge slit, and the inclined projection 169 and the discharge hose 77 may be omitted. In addition, the heatsink 162 may be provided with a plurality of air passages 163 corresponding to the air inlet slots 72.

As is apparent from the foregoing description, according to the present invention, the battery charger cooling system included in the battery charger comprises the heatsink provided with an air passage, and a battery charger cooling fan for producing an air current through the air passage of the heatsink to cool the heatsink. Therefore, the heatsink need not be provided with fins and the battery charger can be formed in a compact construction.

Since the heatsink is disposed with its one end contiguous with the air inlet slots formed in the battery charger case, and the battery charger cooling fan is disposed near the other end of the heatsink, fresh air is able to flow smoothly through the heatsink to cool the heatsink effectively.

When the battery charger cooling system is disposed on the electric vehicle with the longer side of the heatsink extended along the direction of width of the body of the electric vehicle, the air inlet slots can be formed in the side surface of the body of the electric vehicle, which facilitates the design of the covers of the electric vehicle.

Since the battery charger cooling fan discharges air through the discharge hose connected to the battery charger case, the position where the air is discharged from the electric vehicle can optionally be determined.

Because the FETs (field-effect transistors) are arranged in contact with the outer surface of the heatsink, the FETs can forcibly be cooled to ensure the satisfactory performance of the FETS.

Since the discharge hose is extended longitudinally of the body of the electric vehicle and is concealed from view by the side cover, the appearance of the body of the electric vehicle is not spoiled by the discharge hose.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A battery charger cooling system mounted on an electric vehicle, said cooling system comprising:

a battery charger case having an air inlet and an air outlet;

a heatsink provided with an air passage and located adjacent to said air inlet;

a battery charger cooling fan for producing an air current through the air passage of the heatsink to cool the heatsink; and a discharge hose connected to said air outlet of said battery charger case and extending therefrom for receiving air discharged from the battery charger case by the battery charger cooling fan.

2. The cooling system according to claim 1, wherein said heatsink is disposed with one end thereof contiguous with and abutting said air inlet formed in said battery charger case, and the battery charger cooling fan is disposed near an opposite end of the heatsink.

3. The cooling system according to claim 1, wherein said air inlet includes a plurality of slots disposed across a side face of said battery charger case.

4. The cooling system according to claim 1, wherein said discharge hose extends longitudinally of a body of the electric vehicle and is concealed from view by a side cover of the electric vehicle.

5. The cooling system according to claim 1, wherein said electric vehicle is an electric motorcycle.

6. The cooling system according to claim 1, wherein said heatsink has a longer side which extends along a transverse direction of the electric vehicle.

7. The cooling system according to claim 1, wherein a plurality of transistors are arranged in contact with an outer surface of the heatsink.

8. The cooling system according to claim 1, wherein said heatsink is cylindrical in shape.

9. A battery charger mounted on an electric vehicle, comprising:

a battery charger case;

a plurality of field effect transistors disposed within said battery charger case;

a cooling system, including an air inlet formed in said battery charger case, a heatsink disposed adjacent to said air inlet and a cooling fan disposed in said battery charger case at an opposite end of said heatsink from said air inlet, wherein said plurality of field effect transistors are arranged in contact with an outer surface of said heatsink; and an air outlet formed in said battery charger case next to said cooling fan, wherein air discharged from the battery charger case by said cooling fan is discharged through a discharge hose connected to said air outlet, and wherein said discharge hose extends longitudinally of a body of the electric vehicle and is concealed from view by a side cover of the electric vehicle.

10. A battery charger mounted on an electric vehicle, comprising:

a battery charger case;

a plurality of transistors disposed within said battery charger case; and a cooling system, including an air inlet formed in said battery charger case, a tubular heatsink having opposed inner and outer surfaces, a first end of said heatsink being disposed contiguous with said air inlet such that said air inlet communicates with said inner surface of said heatsink, and a cooling fan disposed at a second end portion of said heatsink for producing an airflow over said inner surface of said heatsink, said plurality of transistors being arranged in contact with said outer surface of said heatsink.

11. The battery charger according to claim 10, further including an air outlet formed in said battery charger case next to said cooling fan.

12. The battery charger according to claim 11, wherein air discharged from the battery charger case by said cooling fan is discharged through a discharge hose connected to said air outlet.

13. The battery charger according to claim 12, wherein said discharge hose extends longitudinally of a body of the electric vehicle and is concealed from view by a sidecover of the electric vehicle.

14. The battery charger according to claim 10, wherein said electric vehicle is an electric motorcycle.

15. The battery charger according to claim 10, wherein said heatsink is cylindrical in shape.

16. The battery charger according to claim 10, wherein said air inlet includes a plurality of slots disposed across a side face of said battery charger case.

17. The battery charger according to claim 10, wherein said heatsink has a longer side which extends along a transverse direction of the electric vehicle.

18. A battery charger mounted on an electric vehicle, comprising:

a battery charger case;

a plurality of transistors disposed within said battery charger case;

an air opening formed in said battery charger case;

a rectangular tubular heatsink having an outer sidewall surface and an inner sidewall surface extending between first and second opposed ends, said outer sidewall surface defining an exterior of said rectangular tubular heatsink, said inner sidewall surface defining an interior of said rectangular tubular heatsink, said plurality of transistors being mounted to said outer sidewall surface, said first end of said rectangular tubular heatsink disposed adjacent to said air opening such that said air opening communicates with said interior of said rectangular tubular heatsink; and a cooling fan disposed in said battery charger case at said second end of said rectangular tubular heatsink for providing an airflow through said interior of said rectangular tubular heatsink.

19. The battery charger according to claim 18, and further including a charging cable attached to said battery charger case.

20. The battery charger according to claim 18, and further including an air receiving hose attached to said battery charger case.

21. A cooling system included in a battery charger mounted on an electric vehicle, said cooling system comprising:

a heatsink provided with an air passage; and a battery charger cooling fan for producing an air current through the air passage of the heatsink to cool the heatsink, wherein said heatsink is disposed with one end thereof contiguous with an air inlet formed in a battery charger case, and the battery charger cooling fan is disposed near an opposite end of the heatsink, wherein air discharged from the battery charger case by the battery charger cooling fan is discharged outside through a discharge hose connected to the battery charger case, and wherein said discharge hose extends longitudinally of a body of the electric vehicle and is concealed from view by a side cover of the electric vehicle.

* * * * *